(12) United States Patent
Farrington et al.

(10) Patent No.: US 9,733,783 B1
(45) Date of Patent: Aug. 15, 2017

(54) CONTROLLING A USER INTERFACE

(71) Applicant: Amazon Technologies, Inc., Reno, NV (US)

(72) Inventors: Gareth Charles Farrington, Seattle, WA (US); Michael Lee Brundage, Kirkland, WA (US); Drew Michael Stamps, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 760 days.

(21) Appl. No.: 13/666,363

(22) Filed: Nov. 1, 2012

(51) Int. Cl.
*G06F 3/0481* (2013.01)

(52) U.S. Cl.
CPC .................................. *G06F 3/0481* (2013.01)

(58) Field of Classification Search
CPC .... G06F 3/0482; G06F 3/0484; G06F 3/0481; G06F 3/017; G06F 3/04817; G06F 3/0488; G06F 3/04842; G06F 3/0486; G06F 3/0485; G06F 3/04815; G06F 3/01; G06F 3/04845; G06F 3/048; G06F 3/47; G06F 3/04855; G06F 3/0487; G06F 3/04886; G06F 17/211; G06F 17/212; G06F 17/248; G06F 17/30598; H04L 41/22; H04L 65/403; H04L 67/22; G06Q 30/0205; G06T 11/60; H04N 5/44543
See application file for complete search history.

(56) References Cited

U.S. PATENT DOCUMENTS 8,423,912 B2 * 4/2013 Irani et al. ..................... 715/841

OTHER PUBLICATIONS

Title: Temporary desensitization to movement in the vertical plane when selecting submenus in a user interface with a mouse pointer. Authors: Anonymous Publication date: Sep. 6, 2010.*

* cited by examiner

*Primary Examiner* — Jeffrey A Gaffin
*Assistant Examiner* — Mandrita Brahmachari
(74) *Attorney, Agent, or Firm* — Thomas Horstemeyer, LLP

(57) ABSTRACT

Disclosed are various embodiments for controlling a user interface based at least in part on particular conditions. In response to an element in a user interface being triggered, a first region is identified based at least in part on the location of an input device pointer and the triggered element. An enlarged region is identified based at least in part on the first region. It is determined whether to modify the user interface based at least in part on whether the pointer is moved within the enlarged region.

22 Claims, 7 Drawing Sheets

CONTROLLING A USER INTERFACE

BACKGROUND

Users often interact with a user interface rendered by a computing device. The user interface may, for example, display renderings of network pages, such as web pages, or other types of content.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
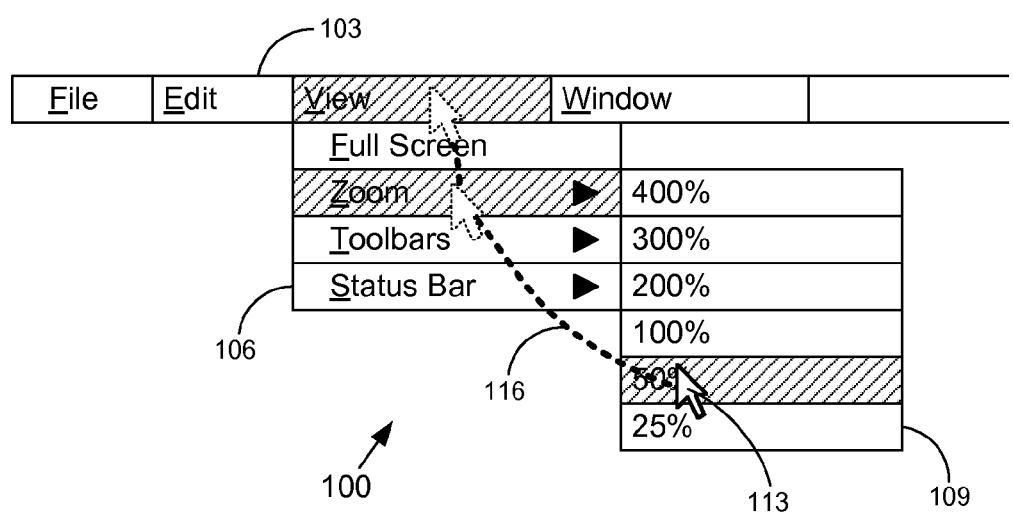
FIG. 1 is a drawing of an example of a portion of a user interface.

The present disclosure is directed towards controlling a user interface generated in, for example, a client computing device. A non-limiting example follows with reference to FIG. 1, which shows an example of a portion of a user interface 100 rendered by a client computing device. The user interface 100 includes a menu bar 103, a first panel 106, and a second panel 109. As may be appreciated, a user may direct the pointer 113 to manipulate various elements within the user interface 100. For instance, a user may use the pointer 113 to select the "view" element within the menu bar 103. Selecting the "view" element within the menu bar 103 causes the first panel 106 to become visible and thus present its elements to the user.

The user may then hover the pointer 113 over one of the elements within the first panel 106. For instance, a user may hover the pointer 113 over the "zoom" element within the first panel 106 to cause the second panel 109 to become visible. In order to interact with one of the elements within the second panel 109, a user may traverse the pointer 113 along the path 116. Because the path 116 traverses over the "toolbars" and "status bar" elements, the panels for these elements may become unintentionally triggered, thereby causing their respective panels to become visible.

However, in accordance with the present disclosure, it may be determined that the user instead intends to interact with an element from within the second panel 109. Accordingly, the client computing device causes panels corresponding to the "toolbars" and "status bar" elements to remain dormant and the second panel 109 to remain visible.

In order to determine whether the user intends to interact with the second panel 109, a non-visible first region, such as a triangular region, is generated that extends from the location of the pointer 113 to the second panel 109. Further, an enlarged region is generated that encompasses the first region. As long as pointer 113 stays within the enlarged region, it is determined that the user intends to direct the pointer 113 to and interact with the second panel 109. However, if the pointer 113 travels outside of the enlarged region, it is determined that the user does not intend to interact with the second panel 109. In the following discussion, a general description of the system and its components is provided, followed by a discussion of the operation of the same.

Figure 2:
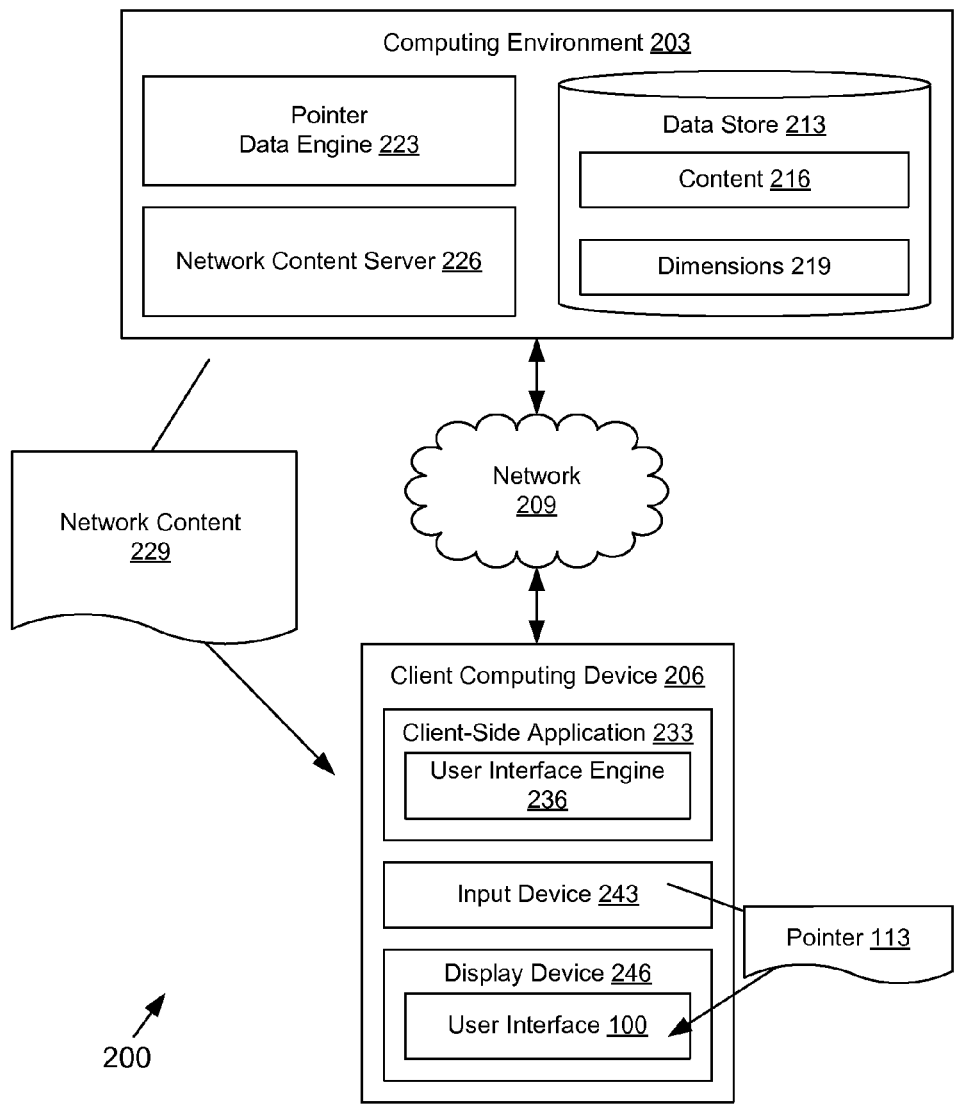
FIG. 2 is a drawing of an example of a networked environment according to various embodiments of the present disclosure.

With reference to FIG. 2, shown is an example of a networked environment 200 according to various embodiments. The networked environment 200 includes one or more computing environments 203 in data communication with one or more client computing devices 206 via a network 209. The network 209 includes, for example, the Internet, intranets, extranets, wide area networks (WANs), local area networks (LANs), wired networks, wireless networks, other suitable networks, or any combination thereof.

The computing environment 203 may comprise, for example, a server computer or any other system providing computing capability. Alternatively, the computing environment 203 may employ multiple computing devices that may be employed that are arranged, for example, in one or more server banks or computer banks or other arrangements. Such computing devices may be located in a single installation or may be distributed among many different geographical locations. For example, the computing environment 203 may include multiple computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various functionality may be executed in the computing environment 203 according to various embodiments. Also, various data is stored in a data store 213 that is accessible to the computing environment 203. The data store 213 may be representative of a plurality of data stores as can be appreciated. The data stored in the data store 213, for example, is associated with the operation of the various applications and/or functional entities described below.

For instance, content 216, dimensions 219, and potentially other data may be stored in the data store 213. The content 216 may be, for example, data that is represented for display on the client computing device 206. According to various embodiments, the content 216 may be, for example, text, images, or any other type of data. The dimensions 219 may be data for configuring the enlarged region that is used for determining whether a user intends to interact with a triggered element. To this end, the dimensions 219 may be represented as, for example, quantities of pixels, aspect ratios, distances, or any other type of value.

The components executed on the computing environment 203 may include a pointer data engine 223, a network content server 226, and potentially other applications, services, processes, systems, engines, or functionality not discussed in detail herein. The pointer data engine 223 is executed to determine the values for the dimensions 219. To this end, the pointer data engine 223 may collect and/or monitor data associated with user behavior on the client computing device 206. This data may be collected in real time as a user interacts with the client computing device 206, or the data may be cached on the client computing device 206 and periodically transmitted to the computing environment 203. In alternative embodiments, this data may be obtained through a series of tests provided to users, and the results may be analyzed in order to determine appropriate values for the dimensions 219.

The network content server 226 may serve data, such as network content 229, to the client computing device 206 or to other devices. The network content 229 may be the same as, or correspond to, the content 216 stored in the data store 213. For instance, the network content 229 may be embodied in the form of a network page, such as a webpage, or any other type of data transferred through the network 209. To facilitate transfer of the network content 229, the network content server 226 may employ a protocol, such as hypertext transfer protocol (HTTP), simple object access protocol (SOAP), and/or other protocols. Accordingly, such a network content server 226 may comprise a commercially available network page server such as, for example, Apache® HTTP Server, Microsoft® Internet Information Services (IIS), and/or other network page servers.

It is understood that some or all of the functionality that is shown in FIG. 2 as being executed by the computing environment 203 may instead be performed by or with the assistance of the client computing device 206. For instance, the pointer data engine 223 and potentially other functionality may be executed by the client computing device 206. Additionally, some or all of the data stored in the data store 213 may be stored in a memory accessibly to the client computing device 206 according to various embodiments.

The client computing device 206 is representative of a plurality of client computing devices 206 that may be coupled to the network 209. The client computing device 206 may comprise, for example, a processor-based system such as a computer system. Such a computer system may be embodied in the form of a desktop computer, a laptop computer, a personal digital assistant, a cellular telephone, a set-top box, a music player, a web pad, a tablet computer system, a game console, or other device with like capability.

The client computing device 206 may be configured to execute various applications, such as a client-side application 233 and potentially other applications. In some embodiments, the client-side application 233 may be executed in the client computing device 206, for example, to access and render the network content 229 or other data. As previously discussed, the network content 229 may be embodied in the form of network pages, such as web pages, or other network content. As such, the client-side application 233 may be embodied in the form of a network page browser, such as a web browser, according to various embodiments. In other embodiments, the client-side application 233 may be embodied in the form of an application that is devoted to perform operations on data that may or may not be obtained from the computing environment 203. In such a case, the client-side application 233 may be embodied in the form of, for example, a word processing application, gaming application, image editing application, or any other type of application executable on the client computing device 206.

The client-side application 233 may include a user interface engine 236 that generates a user interface 100 to facilitate user control, manipulation, and operation of the client computing device 206. The user interface engine 236 may be responsive to various data or conditions occurring within the client computing device 206. As such, the user interface engine 236 may generate a dynamic user interface 100. To this end, in the event that the client-side application 233 is embodied in the form of the network page browser, such as a web browser, the user interface engine 236 may execute JavaScript® or any other type of code that is, for example, embedded with the network content 229. In some embodiments, the user interface engine 236 may be a part of an operating system or any other type of application that generates a user interface 100. For embodiments in which the user interface engine 236 is executed as part of an operating system, the user interface engine 236 may generate, for example, menu bars, menu panels, or any other types of elements to facilitate control of and interaction with the client computing device 206.

The client computing device 206 may include one or more input devices 243, one or more display devices 246, and potentially other components. The input device 243 is a component of the client computing device 206 that facilitates the input of data into the client computing device 206. Accordingly, the input device 243 may be embodied in the form of, for example, a keyboard, a mouse, a gesture recognition device, a touchscreen, a touchpad, a speech recognition device, or any other type of device that facilitates input into the client computing device 206. The input device 243 facilitates user interaction with and control of the client computing device 206, as can be appreciated.

The display device 246 displays renderings of the user interface 100 and potentially other information associated the client computing device 206. As such, the display device 246 may comprise, for example, one or more light emitting devices, such as a cathode ray tube (CRT) display, liquid crystal display (LCD) screen, light emitting diode (LED) screen, gas plasma-based panel display, LCD projectors, or any other device of like capability.

As can be appreciated, the user interface 100 may be a rendering of data in the client computing device 206 and may facilitate user control, manipulation, and operation of the client computing device 206. As non-limiting examples, the user interface 100 may render representations of windows, text, buttons, drop-down lists, radio buttons, tooltips, menus, images, videos, or any other type of element that can be represented in the user interface 100.

Additionally, the user interface 100 may include a rendering of the pointer 113. The pointer 113 may identify locations within the user interface 100 and may be moved within the user interface 100 using, for example, the input device 243. For instance, in the event that the input device 243 is embodied in the form of a mouse, the pointer 113 may be moved by user moving the mouse along a surface. Similarly, in the event that the input device 243 is embodied in the form of a touchscreen, the pointer 113 may be manipulated within the user interface 100 by a user tapping the touchscreen with a finger, for example, and dragging the finger across the touchscreen. When the pointer 113 is located over an element within the user interface 100 that a user intends to invoke, the user may use the input device 243 to select the particular element. To this end, the user may "click" the element using the input device 243. Additionally, the element or functionality associated with the element may be invoked by the pointer 113 being hovered over or near the element. In some embodiments, the element or functionality associated with the element may be invoked by other conditions as well.

Although the present disclosure refers to the client computing device 206 in the context of a networked environment 200, it is understood that the client computing device 206 may or may not be operated within the networked environment 200. Additionally, the client-side application 233 may operate on data that is stored and obtained locally on a memory accessible to the client computing device 206, instead of data that is obtained from the computing environment 203 for the network 209. Moreover, some or all of the functionality shown being executed in the client computing device 206 in FIG. 2 may instead be performed in or with the assistance of the computing environment 203 according to various embodiments.

Next, a general description of the operation of the various components of the networked environment 200 is provided. To begin, it is assumed that the computing environment 203 and client computing device 206 are running and are in data communication through the network 209. Additionally it is assumed that the computing environment 203 has transmitted network content 229 to the client computing device 206 through the network 209, and that the network content 229 has been obtained by the client-side application 233. For example, the network content server 226 may transmit network content 229 in the form of a network page to the client-side application 233. The network content 229 may also include code, such as JavaScript® code or any other type of code, that is executable by the client computing device 206 to create a dynamic user interface 100.

Upon the client-side application 233 obtaining the network content 229 from the network content server 226, the user interface engine 236 may generate the user interface 100 to thereby render the network content 229 and possibly other content on the display device 246. The client computing device 206 may also execute the JavaScript® code or any other type of code that was embedded with the network content 229. As non-limiting examples, the user interface engine 236 may render menus, text regions, images, videos, drop-down lists, radio boxes, or any other types of elements for the user interface 100. One or more of these elements may be triggerable. In this sense, one or more aspects of the element may be dormant until being invoked by a condition. For instance, a triggerable element may be a panel of a menu that is invoked upon the pointer 113 hovering over or selecting another element in another panel of the menu. As another non-limiting example, a triggerable element may be a tooltip that becomes visible upon the pointer 113 hovering over another element. Thus, elements in the user interface 100 may be triggering elements, triggerable elements, non-triggering elements, non-triggerable elements, or any combination thereof.

It may be the case that a user invokes a triggerable element by selecting (e.g., "clicking"), hovering over, or activating the triggering element in some other fashion. Upon the triggerable element being invoked, the user may wish to traverse the pointer 113 from the triggering element to the triggered element (i.e., the triggerable element that has been triggered by the triggering element) or to another element. By traversing the pointer 113 within the user interface 100, the user may unintentionally trigger other triggerable elements. Additionally, traversing the pointer 113 within the user interface 100 may cause the triggered element to revert to its non-triggered (and thus triggerable) state. For instance, the triggered element may disappear from view in the user interface 100 in response to the triggering of another triggerable element. As will now be described, in accordance with the present disclosure, it may be determined whether a user intends to invoke these other triggerable elements or, instead, intends to interact with the already-triggered element.

Upon the triggerable element being triggered, the user interface engine 236 may record the location of the pointer 113 within the user interface 100. The user interface engine 236 may also identify a non-visible first region that extends from the recorded location of the pointer 113 towards the triggered element. This first region may take the shape of a triangle or any other polygonal shape and/or curved shape. For embodiments in which the region is triangular, one vertex of the triangular region may be located at the recorded location of the pointer 113, another vertex of the triangular region may be located at or near a particular feature of the triggered element, and another vertex of the triangular region may be located at or near another particular feature of the triggered element. In some embodiments, one or more of the vertices of the triangular region may be located directly on an outermost edge of the triggered element. In other embodiments, one or more vertices of the triangular region may be spaced a predetermined distance away from, for example, an outermost edge of the triggered element.

With the first region identified, the user interface engine 236 may identify a non-visible enlarged region that is based at least in part on the first region. The enlarged region may encompass all of the first region. Additionally, the enlarged region may be a union of the first region and one or more additional polygonal regions or curved regions. For instance, in some embodiments two triangular regions may be identified that are based at least in part on the first region.

As previously mentioned, the enlarged region may include a first triangular region and two additional triangular regions. In some embodiments, one or both of these additional triangular regions may have a vertex that is located at the recorded location where the pointer 113 was located prior to the first triangular region being identified. In addition, one or both of the additional triangular regions may have a vertex that is at or near a particular feature of the triggered element. For instance, the vertex may be located directly at or a predetermined distance away from an outermost edge of the triggered element.

In addition, each of the additional triangular regions may have a vertex that is outside of the first triangular region. To identify the location of these vertices that are outside of the first triangular region, the user interface engine 236 may identify a first point that is M pixels away from the recorded location of the pointer 113 in the direction towards the triggered element, wherein M is a predetermined number. The predetermined number M may, for example, correspond to a dimension 219 previously identified by the pointer data engine 223 or an agent of the computing environment 203. This first location may be within the first triangular region. The user interface engine 236 may then identify a second point that is N pixels away from the previously identified first location in the direction that is perpendicular to the direction towards the triggered element, wherein N is a predetermined number. The predetermined number N may also correspond to a dimension 219 that was previously identified by the pointer data engine 223 or an agent of the computing environment 203. This second point may be outside of the first triangular region and may be a vertex for one of the additional triangular regions. The user interface engine 236 may also identify a third point that is P pixels away from the previously identified first location in the direction that is perpendicular to the direction towards the triggered element and opposite to the direction used to identify the second location, wherein P is a predetermined number. This third point may also be outside of the first triangular region and may be a vertex for one of the additional triangular regions. It is noted that M, N, and P may or may not be equal values according to various embodiments.

Various procedures may be used to determine values for M, N, and P. For instance, the particular values for M, N, and P may be selected based on trial and error, stored as the dimensions 219, and transmitted to the client computing device 206 in conjunction with the network content 229. In alternative embodiments, the pointer data engine 223 may collect data regarding pointer 113 movement for several users. The pointer data engine 223 may identify start points for the pointer 113, end points for the pointer 113, and the particular paths that the pointer 113 traversed in going from the start point to the endpoint. Based on this data, the pointer data engine 223 may identify a range of movement that pointers 113 typically travel within when traversing from a first point to a second point. Using this identified range, the pointer data engine 223 may select values for M, N, and P. In addition, individual users may perform a similar test, and the results may be used to determine customized values for M, N, and P for each of the users. Regardless of the method used to determine the values for M, N, and P, these values may be, for example, stored as the dimensions 219 and transmitted to the client computing device 206 in conjunction with the network content 229.

According to various embodiments, various methods may be used to determine the enlarged region. For instance, the user interface engine 236 may identify a circle that has a point on the recorded location of the pointer 113 and that has points located outside of the first region. In such an embodiment, the union of the circle and the first region may be the enlarged region. In further embodiments, arcs or other types of curves that extend outside of the first region from the recorded location of the pointer 113 towards the triggered element may be identified. For such an embodiment, the union of the first region and the region defined by the arcs may be considered the enlarged area.

With the enlarged region identified, the user may traverse the pointer 113 within the user interface 100. In some embodiments, a timer may be set, and the location of the pointer 113 may be sampled upon expiration of the timer. The user interface engine 236 may then identify the new location of the pointer 113 within the user interface 100 and determine whether the pointer 113 is within the enlarged region.

If the new location of the pointer 113 is outside of the enlarged region, the user interface engine 236 may determine that the user does not intend to interact with the triggered element. Furthermore, if the pointer 113 is at the same location (i.e., the pointer 113 has not moved), the user interface engine 236 may determine that the user does not intend to interact with the triggered element. Upon it being determined that the user does not intend to interact with the already-triggered element, the user interface engine 236 may cause the already-triggered element to revert to its triggerable state. Additionally, if appropriate, the user interface engine 236 may facilitate another triggerable element being triggered.

If the new location of the pointer 113 is within the enlarged region, the user interface engine 236 may determine that the user intends to interact with the triggered element. As such, the user interface engine 236 may prevent other triggerable elements from being triggered. In addition, the user interface engine 236 may maintain the triggered state of the already-triggered element. Thereafter, a new first region and corresponding enlarged region may be identified, similar to as the process described above, with the new location of the pointer 113 becoming a new point of the first region. Thereafter, the process of determining whether the pointer 113 is within the enlarged region may be repeated as described above.

To determine whether the pointer 113 is within the enlarged region, the user interface engine 236 may separately determine whether the pointer 113 is within the first region or any of the other regions that form the enlarged region. Thus, for an embodiment in which the enlarged region includes multiple triangular regions, the user interface engine 236 may determine whether the pointer 113 is within each of the triangular regions, respectively. As long as the pointer 113 is within one or more of these regions, the user interface engine 236 determines that the pointer 113 is within the enlarged region.

Additionally, the user interface engine 236 may be configured to execute a function that determines whether the pointer 113 is within a triangular region. The function may take the three vertices of the triangular region as inputs, and the output may be a value that indicates whether the pointer 113 is within the triangular region defined by the vertices. The function may be particularly efficient in terms of its processing time and consumption of computing resources. As such, the user interface engine 236 may call this function for each of the triangular regions, with the respective vertices being an input for each function call. Thus, the user interface engine 236 may relatively efficiently determine whether the pointer 113 is within the enlarged region by repeatedly calling the same efficient function to determine whether the pointer 113 is within one of the sub-regions.

Figure 3A:
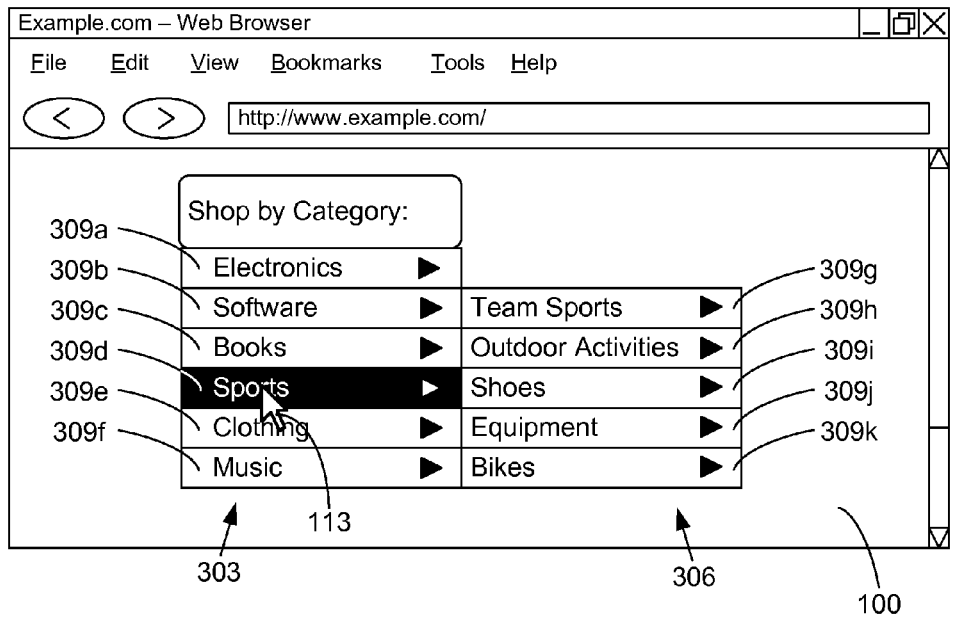
FIGS. 3A-3D are drawings of examples of a user interface rendered by a client computing device in the networked environment of FIG. 2 according to various embodiments of the present disclosure.

Referring next to FIG. 3A, shown is a drawing of an example of a user interface 100 rendered by the client computing device 206 (FIG. 2) according to various embodiments of the present disclosure. The user interface 100 includes a rendering of a first panel 303, a second panel 306, the pointer 113, and other features not discussed in detail for clarity. The first panel 303 further includes multiple triggering elements 309*a*-309*f*. In the present example, using the input device 243 (FIG. 2) to control the pointer 113 to hover over or select one of the triggering elements 309*a*-309*f* causes a corresponding triggerable element to be invoked. For example, hovering over or selecting the triggering element 309*d* causes the second panel 306 to become visible, as is shown in FIG. 3A. The second panel 306 includes additional triggering elements 309*g*-309*k* that invoke additional panels upon being triggered.

Figure 3B:
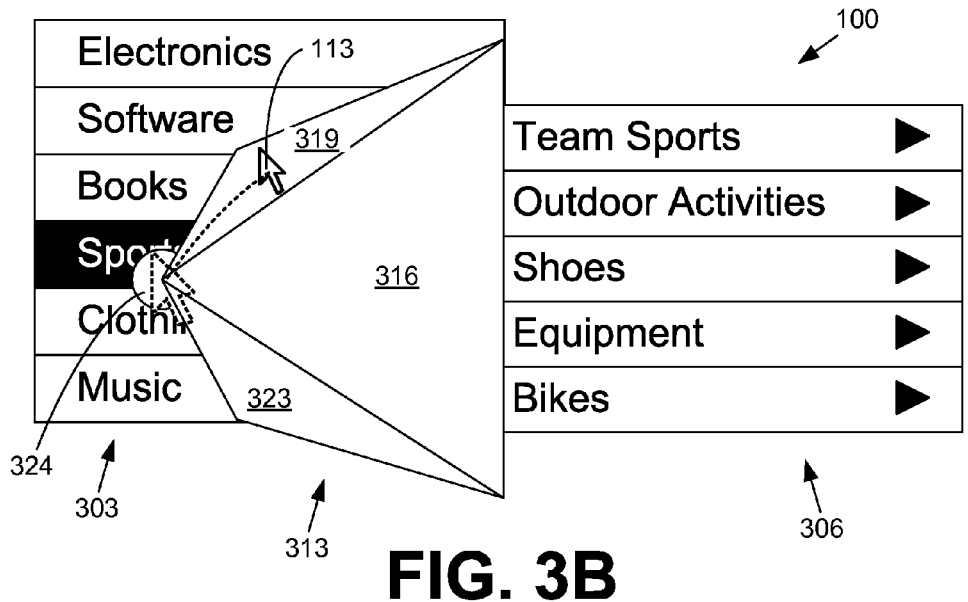

Turning now to FIG. 3B, shown is a drawing of a portion of the user interface 100. In addition, the drawing shown includes an overlay of the enlarged region 313 generated by the user interface engine 236 (FIG. 2). It is noted that the enlarged region 313 may or may not be visible to the user.

In the present embodiment, the enlarged region comprises a first triangular region 316, a second triangular region 319, a third triangular region 323, and a circular region 324. The locations of the second triangular region 319 and the third triangular region 323 are based at least in part on the location of the first triangular region 316. The location of the circular region 324 is based at least in part on the location of the previous location of the pointer 113 at the time when the enlarged region 313 was generated. The diameter of the circular region 324 may be relatively small so that the circular region 324 may account for relatively small movement of the pointer 113. Thus, if a relatively small movement of the pointer 113 is, for example, in a direction away from the triggered second panel 306, the user interface engine 236 may still determine that the user intends to interact with the second panel 306.

As shown, a user has moved the location of the pointer 113 within the user interface 100, and the pointer 113 remains within the enlarged region 313. More specifically, the pointer 113 remains within the second triangular region 319. Because the pointer 113 is within the enlarged region 313, the user interface engine 236 determines that the user intends to interact with the second panel 306. Accordingly, the second panel 306 remains visible, and no other triggerable elements have been invoked.

Figure 3C:
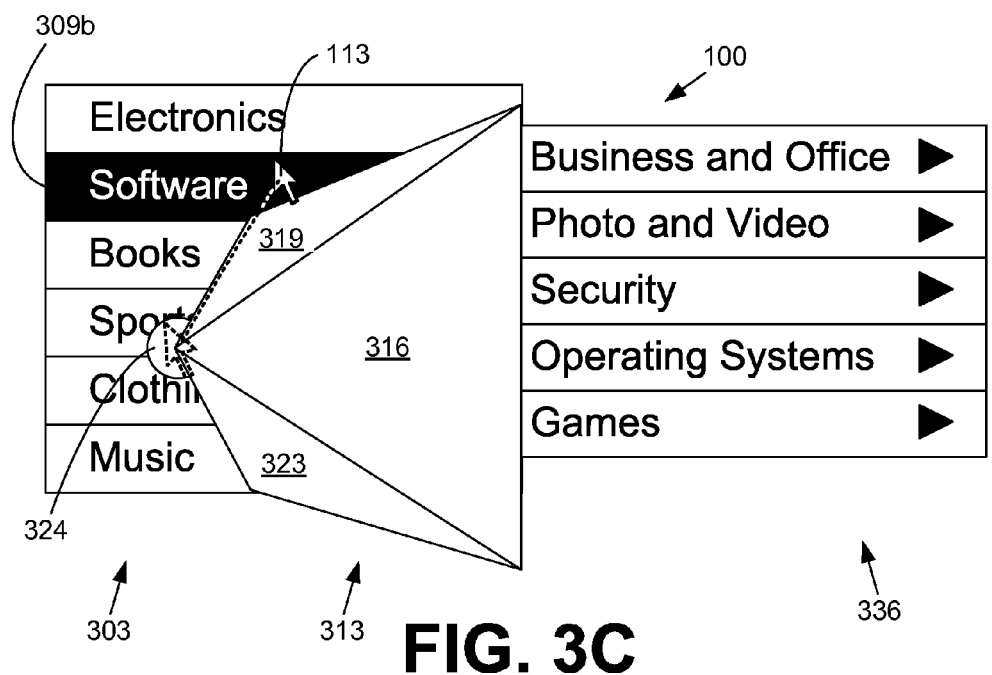

Turning now to FIG. 3C, shown is another example of a portion of the user interface 100 according to various embodiments of the present disclosure. As shown, a user has moved the location of the pointer 113, and the pointer 113 is now outside of the enlarged region 313. Because the pointer 113 is outside of the enlarged region 313, the user interface engine 236 has determined that the user does not intend to interact with the second panel 306 (FIG. 3B). Accordingly, the pointer 113 has triggered the triggering element 309b. In response, the user interface engine 236 has made a third panel 336 visible.

Figure 3D:
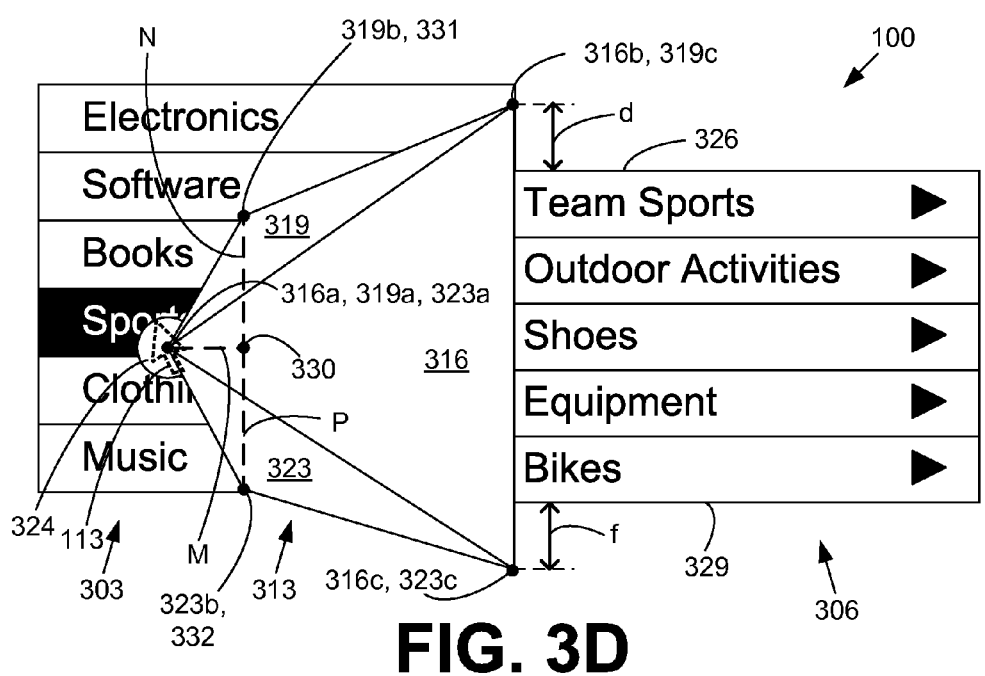

With reference now to FIG. 3D, shown is another drawing of a portion of the user interface 100. As previously discussed, the enlarged region 313 may include a first triangular region 316 one or more polygonal regions, and/or one or more circular regions 324. In the present example, the enlarged region 313 includes the first triangular region 316, a second triangular region 319, and a third triangular region 323. The first triangular region 316 includes a first vertex 316a, a second vertex 316b, and a third vertex 316c. The first vertex 316a corresponds to the location of the pointer 113 at the time when the first triangular region 316 is generated. The second vertex 316b is a predetermined distance d away from a first outermost edge 326 of the second panel 306. Similarly, the third vertex 316c is a predetermined distance f away from a second outermost edge 329 of the second panel 306. D and f may or may not be equal according to various embodiments. Although in the present example the first triangular region 316 is an isosceles triangle, the first triangular region 316 in other embodiments may take the form of other types of triangles, depending on the particular locations of its vertices 316a-316c.

The second triangular region 319 includes a first vertex 319a, a second vertex 319b, and a third vertex 319c. The first vertex 319a of the second triangular region 319 shares the same point as the first vertex 316a of the first triangular region 316. The third vertex 319c of the second triangular region 319 shares the same point as the second vertex 316b of the first triangular region 316.

In order to identify the location of the second vertex 319b of the second triangular region 319, the user interface engine 236 may identify a first point 330 that is a distance of M pixels away from the location of the first vertex 316a of the first triangular region 316, wherein M is a predetermined number. The user interface engine 236 may then identify a second point 331 that is N pixels away from the first point 330, wherein N is a predetermined number, and store this second point 331 as the second vertex 319b for the second triangular region 319.

The third triangular region 323 includes a first vertex 323a, a second vertex 323b, and a third vertex 323c. The first vertex 323a of the third triangular region 323 shares the same location as the first vertex 316a of the first triangular region 316. The third vertex 323c of the third triangular region 323 shares the same location as the third vertex 316c of the first triangular region 316.

In order to identify the location of the second vertex 323b of the third triangular region 323, the user interface engine 236 may identify a third point 332 that is P pixels away from the first point 330, wherein P is a predetermined number, and store this third point 332 as the second vertex 323b for the third triangular region 323. It is noted that M, N, and/or P may or may not be the same value according to different embodiments.

Figure 4A:
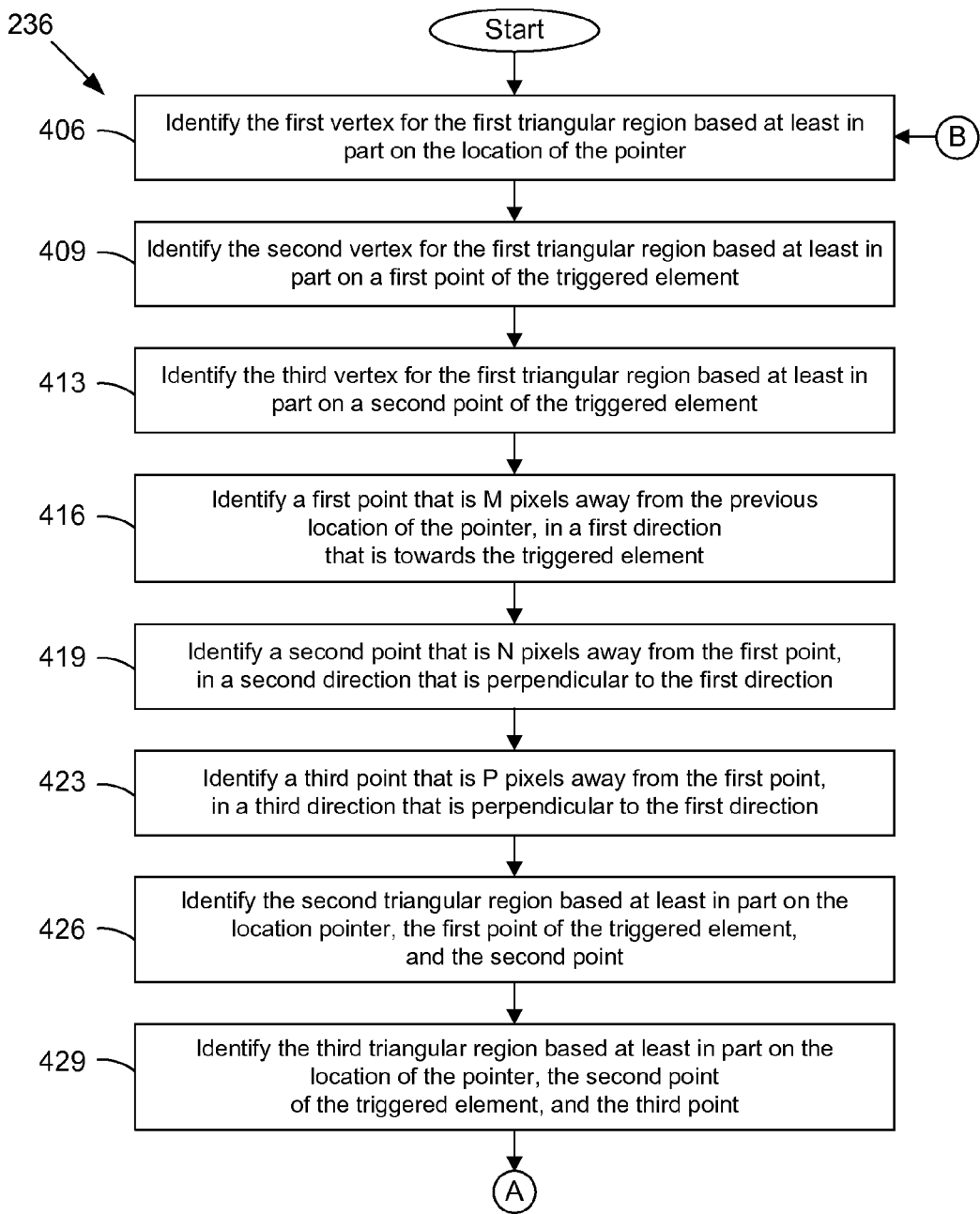
FIGS. 4A-4B are flowcharts illustrating examples of functionality implemented as portions of the user interface engine in FIG. 2 executed in a client computing device in the networked environment of FIG. 2 according to various embodiments of the present disclosure.
Figure 4B:
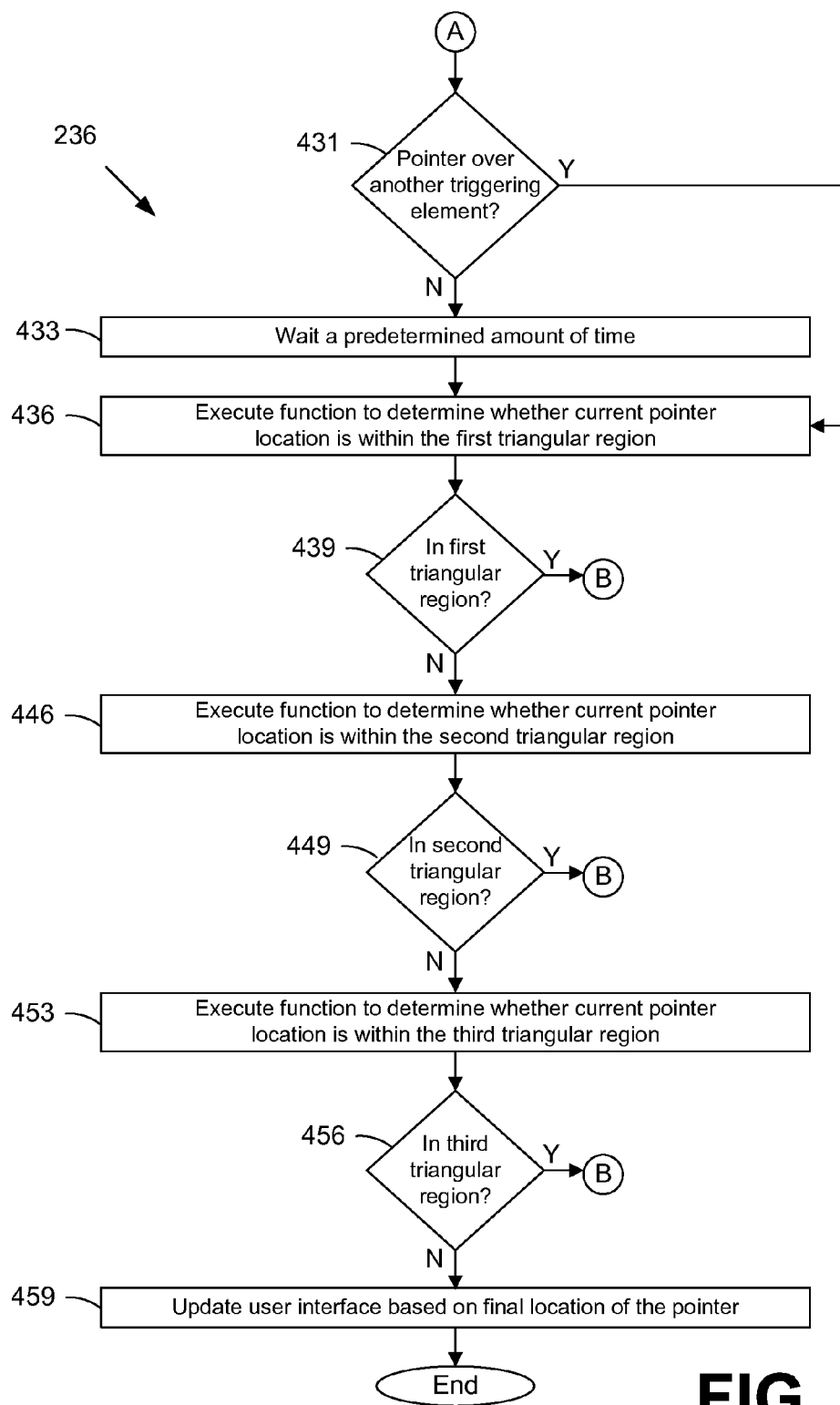

Referring next to FIGS. 4A-4B, shown is a flowchart that provides an example, among others, of the operation of a portion of the user interface engine 236 according to various embodiments. In particular, the flowchart of FIGS. 4A-4B provides an example of determining whether a user intends to interact with a triggerable element in response to the pointer 113 (FIG. 1) triggering the triggerable element. It is understood that the flowchart of FIGS. 4A-4B provides merely an example of the many different types of functional arrangements that may be employed to implement the operation of the portion of the user interface engine 236 as described herein. As an alternative, the flowchart of FIGS. 4A-4B may be viewed as depicting an example of steps of a method implemented in the client computing device 206 (FIG. 2) according to one or more embodiments.

Beginning with box 406, the user interface engine 236 identifies the first vertex 316a (FIG. 3D) for the first triangular region 316 (FIG. 3D) based at least in part on the location of the pointer 113. The user interface engine 236 then moves to box 409 and identifies the second vertex 316b (FIG. 3D) for the first triangular region 316 based at least in part on a first feature of the triggerable element. For example, the second vertex 316b may be located on or near a point or an edge of the triggerable element. Next, as shown in box 413 the third vertex 316c (FIG. 3D) for the first triangular region 316 is identified based at least in part on a second feature of the triggered element. For example, the third vertex 316c may be located on or near another point or edge of the triggered element.

The user interface engine 236 then moves to box 416 and identifies a first point 330 (FIG. 3D) that is M pixels away from the previous location of the pointer, in a first direction that is towards the triggered element. As shown in box 419, a second point 331 (FIG. 3D) is identified that is N pixels away from the first point 330, in a direction that is perpendicular to the first direction. Thus, the second point 331 is located outside of the first triangular region 316. The user interface engine 236 then identifies a third point 332 (FIG. 3D) that is P pixels away from the first point 330, in a third direction that is perpendicular to the first direction, as shown in box 423. The third point 332 is also located outside of the first triangular region 316.

In box 426 the user interface engine 236 identifies the second triangular region 319 (FIG. 3B) based at least in part on the location of the pointer 113, the first feature of the triggered element (e.g., an edge or point of the triggered element), and the second point 331 that is outside of the first triangular region 316. Similarly, in box 429, the third triangular region 323 is identified based at least in part on the location of the pointer 113, the second feature of the triggered element (e.g., an edge or point of the triggered element), and the third point 332 that is located outside of the first triangular region 316.

In box 431, the user interface engine 236 determines whether the pointer 113 has moved over another triggering element 309a-309k (FIG. 3A). If the pointer 113 has not moved over another triggering element 309a-309k, the user interface engine 236 moves to box, where the user interface engine 236 then waits a predetermined amount of time. If the pointer 113 has moved over another triggering element 309a-309k, the user interface engine 236 moves directly to box 436. By skipping box 433 if the pointer 113 has moved over another triggering element, the user may be presented with a dynamic user interface that responds relatively quickly when another element is to be triggered, if appropriate.

In box 436, the user interface engine 236 then executes a function to determine whether the current location of the pointer 113 is within the first triangular region 316. As shown in box 439, if the pointer 113 is within the first triangular region, the user interface engine 236 proceeds to box 406. Otherwise, if the pointer 113 is not within the first triangular region 316, the user interface engine 236 moves to box 446 and executes the same function to determine whether the current location of the pointer 113 is within the second triangular region 319. If so, the user interface engine 236 moves to box 406, as indicated by box 449. If the pointer 113 is not within the second triangular region 319, the user interface engine 236 moves to box 453. In box 453, the same function is executed to determine whether the pointer is located within the third triangular region 323. If so, the user interface engine 236 moves from box 456 to box 406. Thus, from boxes 436-456, the user interface engine 236 determines whether the pointer 113 is within the enlarged region 313 (FIG. 3B) by determining whether the pointer 113 is within the first triangular region 316, the second triangular region 319, or the third triangular region 323.

If the pointer 113 is within the enlarged region 313, the user interface engine 236 determines that the user intends to interact with the triggered element, returns to box 406, and the process is repeated as shown. If the pointer 113 is not within the third triangular region 323, the user interface engine 236 moves to box 459 and updates the user interface 100 based on the final location of the pointer. For example, the user interface engine 236 may cause the previously-triggered element to no longer be visible. Additionally, the user interface engine 236 may cause another triggerable element may become invoked based at least in part on the location of the pointer 113.

Figure 5:
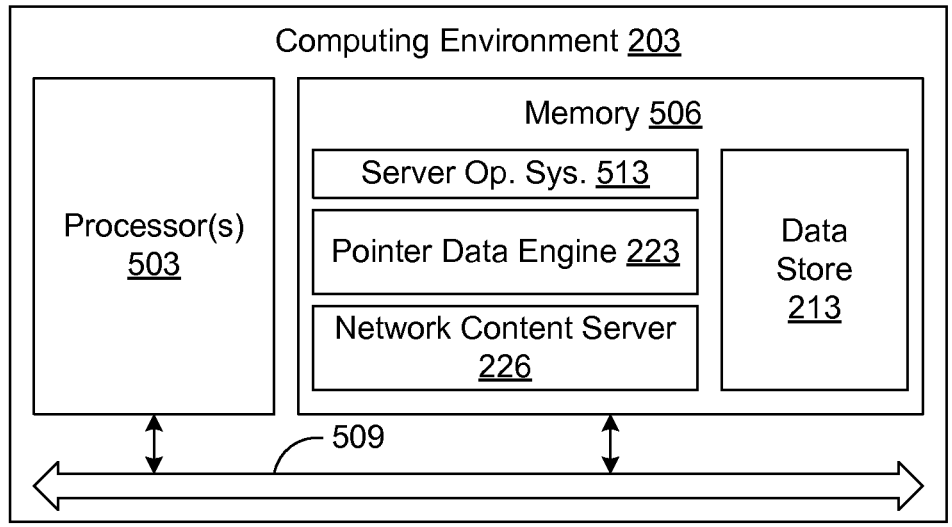
FIG. 5 is a schematic block diagram that provides an example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes at least one processor circuit, for example, having a processor 503 and a memory 506, both of which are coupled to a local interface 509. To this end, the computing environment 203 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the pointer data engine 223, the network content server 226, and potentially other applications. Also stored in the memory 506 may be the data store 213 and other data. In addition, a server operating system 513 may be stored in the memory 506 and executable by the processor 503.

Figure 6:
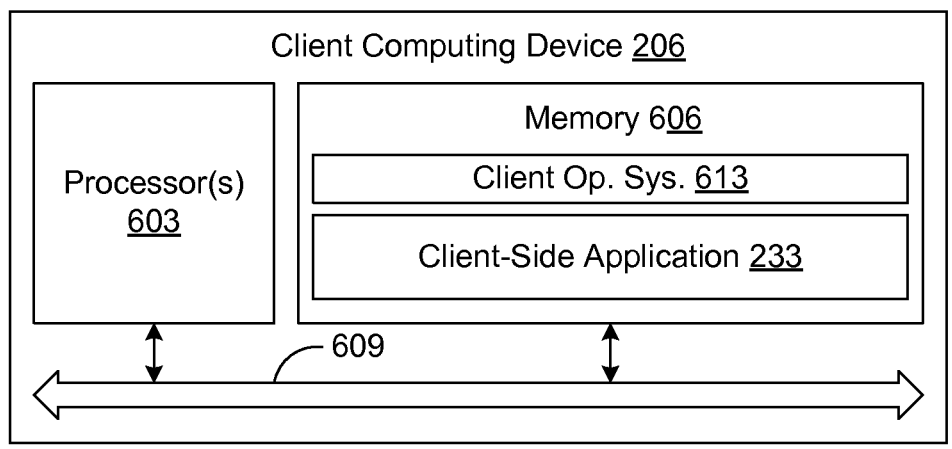
FIG. 6 is a schematic block diagram that provides an example illustration of a client computing device employed in the networked environment of FIG. 2 according to various embodiments of the present disclosure.

With reference to FIG. 6, shown is a schematic block diagram of the client computing device 206 according to an embodiment of the present disclosure. The client computing device 206 includes at least one processor circuit, for example, having a processor 603 and a memory 606, both of which are coupled to a local interface 609. To this end, the client computing device 206 may comprise, for example, at least one personal computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 is the client-side application 233 and potentially other applications. In addition, a client operating system 613 may be stored in the memory 606 and executable by the processor 603.

Reference is now made to FIGS. 5 and 6. It is understood that there may be other applications that are stored in the memories 506 and 606 and are executable by the processors 503 and 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memories 506 and 606 and are executable by the processors 503 and 603. In this respect, the term "executable" means a program file that is in a form that can ultimately be run by the processors 503 or 603. Examples of executable programs may be, for example, a compiled program that can be translated into machine code in a format that can be loaded into a random access portion of the memories 506 or 606 and run by the processors 503 or 603, source code that may be expressed in proper format such as object code that is capable of being loaded into a random access portion of the memories 506 or 606 and executed by the processors 503 or 603, or source code that may be interpreted by another executable program to generate instructions in a random access portion of the memories 506 or 606 to be executed by the processors 503 or 603, etc. An executable program may be stored in any portion or component of the memories 506 or 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 506 and 606 are defined herein as including both volatile and nonvolatile memory and data storage components. Volatile components are those that do not retain data values upon loss of power. Nonvolatile components are those that retain data upon a loss of power. Thus, the memories 506 and 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors 503 and 603 may represent multiple processors 503 and 603, respectively, and the memories 506 and 606 may represent multiple memories 506 and 606, respectively, that operate in respective parallel processing circuits. In such a case, the local interfaces 509 and 609 may be an appropriate network 209 (FIG. 2) that facilitates communication between any the multiple processors 503 or 603, between any of the processors 503 or 603 and any of the memories 506 or 606, or between any the memories 506 or 606, etc. The local interfaces 509 and 609 may comprise additional systems designed to coordinate this communication, including, for example, performing load balancing. The processors 503 and 603 may be of electrical or of some other available construction.

Although the pointer data engine 223, the network content server 226, the client-side application 233, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4A-4B show the functionality and operation of an implementation of portions of the user interface engine 236. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4A-4B show a specific order of execution, it is understood that the order of execution may differ from that which is depicted. For example, the order of execution of two or more blocks may be scrambled relative to the order shown. Also, two or more blocks shown in succession in FIGS. 4A-4B may be executed concurrently or with partial concurrence. Further, in some embodiments, one or more of the blocks shown in FIGS. 4A-4B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the pointer data engine 223, the network content server 226, and the client-side application 233, that comprises software or code can be embodied in any non-transitory computer-readable medium for use by or in connection with an instruction execution system such as, for example, a processor 503 or 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium containing machine readable instructions that, when executed by a processor of a computing device, cause the computing device to at least:
    identify a first location of an input device pointer in response to a user interface element being triggered;
    identify a first point based at least in part on the first location of the input device pointer;
    identify a second point based at least in part on a first outermost edge of the user interface element;
    identify a third point based at least in part on a second outermost edge of the user interface element, wherein the first point, the second point, and the third point define a first triangular region;
    identify a fourth point that is outside of the first triangular region, wherein the first point, the second point, and the fourth point define a second triangular region;
    identify a fifth point that is outside of the first triangular region, wherein the first point, the third point, and the fifth point define a third triangular region;
    determine whether a second location of the input device pointer is within the first triangular region, the second triangular region, or the third triangular region; and
    determine whether to modify the user interface based at least in part on whether the second location of the input device pointer is within the first triangular region, the second triangular region, or the third triangular region.

2. The non-transitory computer-readable medium of claim 1, wherein the machine readable instructions that cause the computing device to identify the fourth point further comprise machine readable instructions that cause the computing device to at least:

identify a sixth point that is a first predetermined distance from the first point in a first direction that is towards the user interface element; and identify the fourth point as being a second predetermined distance from the sixth point in a direction that is perpendicular to the first direction that is towards the user interface element.

3. The non-transitory computer-readable medium of claim 1, wherein the machine readable instructions that cause the computing device to at least identify the second point based at least in part on the first outermost edge of the triggered element further comprise machine readable instructions that cause the computing device to at least identify the second point as being a predetermined distance away from the first outermost edge of the user interface element.

4. The non-transitory computer-readable medium of claim 1, further comprising machine readable instructions that cause the computing device to at least modify at least one of a triggerable element or the user interface element in response to the second location of the input device pointer being outside of the first triangular region, the second triangular region, and the third triangular region.

5. A system, comprising:
a computing device comprising a processor and a memory; and
machine readable instructions stored in the memory that, when executed by the processor, cause the computing device to at least:
identify a first location of an input device pointer in response to a user interface element being triggered;
identify a first point based at least in part on the first location of the input device pointer;
identify a second point based at least in part on a first outermost edge of the user interface element;
identify a third point based at least in part on a second outermost edge of the user interface element, wherein the first point, the second point, and the third point define a first triangular region;
identify a fourth point that is outside of the first triangular region, wherein the first point, the second point, and the fourth point define a second triangular region;
identify a fifth point that is outside of the first triangular region, wherein the first point, the third point, and the fifth point define a third triangular region;
determine that a second location of the input device pointer is within at least one of the first triangular region, the second triangular region, or the third triangular region; and
modify the user interface based at least in part on a determination that the second location of the input device pointer is within at least one of the first triangular region, the second triangular region, or the third triangular region.

6. The system of claim 5, wherein:
the machine readable instructions that cause the computing device to identify the first point further cause the computing device to identify the first point based at least in part on a first predetermined distance from the first location of the input device pointer in a first direction that is towards the triggered element; and
the machine readable instructions that cause the computing device to identify the second point further cause the computing device to identify the second point based at least in part on a second predetermined distance from the first point in a second direction that is perpendicular to the first direction.

7. The system of claim 5, wherein the machine readable instructions, when executed by the processor, further cause the computing device to at least identify the first location of the input device pointer as being a first vertex for the second triangular region.

8. The system of claim 6, wherein the machine readable instructions, when executed by the processor, further cause the computing device to at least identify a location that is a predetermined distance from a feature of the user interface element as being a third vertex for the second triangular region.

9. The system of claim 5, wherein the machine readable instructions, when executed by the processor, further cause the computing device to at least modify the user interface element in response to a determination that the second location of the input device pointer is within at least one of the first triangular region, the second triangular region, or the third triangular region.

10. The system of claim 5, wherein the machine readable instructions, when executed by the processor, further cause the computing device to at least modify a triggerable element other than the user interface element in response to a determination that the second location of the input device pointer is within at least one of the first triangular region, the second triangular region, or the third triangular region.

11. The system of claim 5, wherein the machine readable instructions are executed in conjunction with a network page browser.

12. The system of claim 5, wherein the user interface element comprises a menu panel.

13. The system of claim 5, wherein:
the machine readable instructions that cause the computing device to at least identify the third point further cause the computing device to at least identify the third point based at least in part on a third predetermined distance from the first location of the input device pointer in a third direction that is towards the user interface element; and
the machine readable instructions that cause the computing device to at least identify the third point further cause the computing device to at least identify the fourth point based at least in part on a fourth predetermined distance from the first point in a fourth direction that is perpendicular to the third direction.

14. The system of claim 13, wherein the machine readable instructions, when executed by the processor, further cause the computing device to at least identify the first location of the input device pointer as being a second vertex for the third triangular region.

15. The system of claim 13, wherein the machine readable instructions, when executed by the processor, further cause the computing device to at least identify a location that is a predetermined distance from a feature of the user interface element as being a third vertex for the third triangular region.

16. The system of claim 13, wherein:
the machine readable instructions, when executed by the processor, further cause the computing device to at least identify a point based at least in part the first location of the input device; and
wherein the point comprises a vertex for the first triangular region, the second triangular region, and the third triangular region.

17. A method, comprising
identifying, via a computing device, a first location of an input device pointer in response to a user interface element being triggered;

identifying, via the computing device, a first point based at least in part on the first location of the input device pointer;

identifying, via the computing device, a second point based at least in part on a first outermost edge of the user interface element;

identifying, via the computing device, a third point based at least in part on a second outermost edge of the user interface element, wherein the first point, the second point, and the third point define a first triangular region;

identifying, via the computing device, a fourth point that is outside of the first triangular region, wherein the first point, the second point, and the fourth point define a second triangular region;

identifying, via the computing device, a fifth point that is outside of the first triangular region, wherein the first point, the third point, and the fifth point define a third triangular region;

determining, via the computing device, that a second location of the input device pointer is within the first triangular region, the second triangular region, or the third triangular region; and modifying, via the computing device, the user interface based at least in part on whether the second location of the input device pointer is within the first triangular region, the second triangular region, or the third triangular region.

18. The method of claim 17, further comprising:

identifying, via the computing device, a sixth point that is a first predetermined distance from the first point in a first direction that is towards the user interface element; and identifying, via the computing device, the fourth point as being a second predetermined distance from the sixth point in a direction that is perpendicular to the first direction that is towards the user interface element.

19. The method of claim 17, wherein identifying, via the computing device, the second point based at least in part on the first outermost edge of the triggered element further comprises identifying, via the computing device, the second point as being a predetermined distance away from the first outermost edge of the user interface element.

20. The method of claim 17, further comprising modifying, via the computing device, a triggerable element in response to the second location of the input device pointer being outside of at least one of the first triangular region, the second triangular region, or the third triangular region.

21. The method of claim 17, further comprising modifying, via the computing device, the user interface element in response to the second location of the input device pointer being outside of the first triangular region, the second triangular region, and the third triangular region.

22. The method of claim 17, wherein the user interface element comprises a menu panel.

* * * * *